(12) United States Patent
Sweeney et al.

(10) Patent No.: US 9,307,037 B2
(45) Date of Patent: Apr. 5, 2016

(54) SYSTEM AND METHOD FOR UTILIZING ATTENDEE LOCATION INFORMATION WITH AN EVENT PLANNER

(75) Inventors: Jeffrey Sweeney, Olathe, KS (US);
Kelsyn Rooks, Overland Park, KS (US);
Jeff Stafford, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 341 days.

(21) Appl. No.: 12/424,178

(22) Filed: Apr. 15, 2009

(65) Prior Publication Data

US 2010/0267399 A1    Oct. 21, 2010

(51) Int. Cl.
*H04L 29/08*    (2006.01)
*G06Q 10/10*    (2012.01)
*H04W 4/02*    (2009.01)

(52) U.S. Cl.
CPC ............... *H04L 67/24* (2013.01); *G06Q 10/10* (2013.01); *H04L 67/18* (2013.01); *H04W 4/02* (2013.01)

(58) Field of Classification Search
CPC ..... G06Q 10/109; G06Q 10/02; G06Q 10/10; G06Q 10/1093; G06Q 10/06311; G06Q 10/1095; G06Q 50/01; G06Q 10/063116; G06Q 30/0252; H04W 4/206; Y10S 707/99943; H04L 67/24; H04L 51/32; H04L 67/02
USPC ............ 705/6, 14.49, 5–7.42; 709/206, 224, 709/204–229; 455/456.3, 457, 404.2, 404, 455/2, 414.2, 440, 456.1, 456.2, 456.5, 455/456.6, 459; 707/724, 803, 918, 944, 707/951, E17.11
See application file for complete search history.

(56) References Cited

U.S. PATENT DOCUMENTS

| | | | |
|---|---|---|---|
| 4,598,275 A | 7/1986 | Ross et al. |
| 4,814,751 A | 3/1989 | Hawkins et al. |
| 5,301,353 A | 4/1994 | Borras et al. |
| 6,057,764 A | 5/2000 | Williams |
| 6,259,405 B1 | 7/2001 | Stewart et al. |
| 6,327,535 B1 | 12/2001 | Evans et al. |
| 6,331,817 B1 | 12/2001 | Goldberg |
| 6,396,413 B2 | 5/2002 | Hines et al. |
| 6,531,963 B1 | 3/2003 | Nyfelt |
| 6,774,811 B2 | 8/2004 | Kaufman et al. |
| 6,894,612 B2 | 5/2005 | Xydis |
| 6,917,288 B2 | 7/2005 | Kimmel et al. |
| 6,963,277 B2 | 11/2005 | Imasaki et al. |
| 6,968,179 B1 | 11/2005 | De Vries |
| 7,102,509 B1 | 9/2006 | Anders et al. |
| 7,120,135 B2 | 10/2006 | Kim |
| 7,123,126 B2 | 10/2006 | Tanaka et al. |

(Continued)

OTHER PUBLICATIONS

U.S. Appl. No. 12/428,051; Notice of Allowance dated Dec. 3, 2012; 25 pages.

(Continued)

*Primary Examiner* — Michael Faragalla
*Assistant Examiner* — Gerald Oliver
(74) *Attorney, Agent, or Firm* — Swanson & Bratschun, L.L.C.

(57) ABSTRACT

A system and method for providing enhanced event planning capabilities including receiving information regarding an invitee. The invitee information may be stored for later use. The presence of the invitee at an event may be detected. In response to the detected presence, information may be communicated to a communications device associated with the invitee regarding the event, using the stored invitee information.

16 Claims, 5 Drawing Sheets

(56) References Cited

U.S. PATENT DOCUMENTS

| | | | |
|---|---|---|---|
| 7,132,941 | B2 | 11/2006 | Sherlock |
| 7,138,920 | B2 | 11/2006 | Nyfelt |
| 7,142,122 | B2 | 11/2006 | Butikofer et al. |
| 7,149,297 | B2 | 12/2006 | Idoni et al. |
| 7,167,094 | B2 | 1/2007 | Ciarcia et al. |
| 7,203,674 | B2 * | 4/2007 | Cohen |
| 7,218,930 | B2 | 5/2007 | Ko et al. |
| 7,275,689 | B2 | 10/2007 | Mak |
| 7,286,158 | B1 | 10/2007 | Griebenow |
| 7,286,837 | B2 * | 10/2007 | Giniger et al. ............. 455/456.3 |
| 7,319,386 | B2 | 1/2008 | Collins et al. |
| 7,366,522 | B2 | 4/2008 | Thomas |
| 7,382,895 | B2 | 6/2008 | Bramblet et al. |
| 7,386,595 | B1 | 6/2008 | Bloomer et al. |
| 7,426,197 | B2 | 9/2008 | Schotten et al. |
| 7,433,648 | B2 | 10/2008 | Bridgelall |
| 7,454,203 | B2 | 11/2008 | Levitan |
| 7,460,020 | B2 | 12/2008 | Reyes et al. |
| 7,495,551 | B2 | 2/2009 | Waxman |
| 7,504,940 | B2 | 3/2009 | Luebke et al. |
| 7,505,607 | B2 | 3/2009 | Meunier et al. |
| 7,508,310 | B1 * | 3/2009 | Light et al. ................. 340/573.1 |
| 7,515,043 | B2 | 4/2009 | Welch et al. |
| 7,554,446 | B2 | 6/2009 | Ciarcia et al. |
| 7,561,019 | B2 | 7/2009 | Sasakura et al. |
| 7,592,909 | B2 | 9/2009 | Zaruba et al. |
| 7,634,283 | B2 | 12/2009 | Luebke |
| 7,671,728 | B2 | 3/2010 | Buehler |
| 7,693,512 | B1 | 4/2010 | West |
| 7,739,340 | B2 * | 6/2010 | Arenburg et al. ............. 709/206 |
| 7,751,829 | B2 | 7/2010 | Masuoka et al. |
| 7,801,975 | B2 * | 9/2010 | Styles ........................... 709/221 |
| 7,844,055 | B2 * | 11/2010 | Mukherjee et al. ........... 380/250 |
| 7,898,419 | B2 | 3/2011 | Cristache |
| 7,907,955 | B2 | 3/2011 | Virk et al. |
| 7,984,105 | B2 | 7/2011 | Griffin |
| 8,040,219 | B2 | 10/2011 | Haartsen et al. |
| 8,041,586 | B2 | 10/2011 | Jethani et al. |
| 8,064,928 | B2 | 11/2011 | Venkatachalam |
| 8,091,778 | B1 | 1/2012 | Block et al. |
| 8,102,238 | B2 | 1/2012 | Golander et al. |
| 8,331,931 | B2 | 12/2012 | Whitesell et al. |
| 8,428,620 | B2 | 4/2013 | Sweeney et al. |
| 8,655,693 | B2 | 2/2014 | Gupta |
| 8,791,817 | B2 | 7/2014 | Sweeney et al. |
| 8,983,488 | B2 | 3/2015 | Sweeney et al. |
| 2001/0001239 | A1 | 5/2001 | Stewart |
| 2001/0046215 | A1 | 11/2001 | Kim |
| 2002/0029164 | A1 * | 3/2002 | Sugar et al. ..................... 705/13 |
| 2002/0077077 | A1 | 6/2002 | Rezvani et al. |
| 2002/0091569 | A1 | 7/2002 | Kitaura et al. |
| 2002/0104012 | A1 | 8/2002 | Xydis |
| 2002/0156787 | A1 * | 10/2002 | Jameson et al. ................ 707/10 |
| 2002/0193973 | A1 | 12/2002 | Kinoshita et al. |
| 2003/0197612 | A1 | 10/2003 | Tanaka et al. |
| 2003/0210148 | A1 | 11/2003 | Imasaki et al. |
| 2004/0198311 | A1 | 10/2004 | Aerrabotu et al. |
| 2004/0225681 | A1 | 11/2004 | Chaney et al. |
| 2004/0266421 | A1 | 12/2004 | Kato et al. |
| 2005/0101335 | A1 * | 5/2005 | Kelly et al. ................. 455/456.3 |
| 2005/0206518 | A1 | 9/2005 | Welch et al. |
| 2005/0280535 | A1 | 12/2005 | Gary, Jr. |
| 2005/0280555 | A1 * | 12/2005 | Warner, IV ................. 340/932.2 |
| 2006/0015376 | A1 | 1/2006 | Sattler et al. |
| 2006/0015491 | A1 | 1/2006 | Lee et al. |
| 2006/0031326 | A1 | 2/2006 | Ovenden |
| 2006/0063540 | A1 | 3/2006 | Beuck |
| 2006/0075038 | A1 | 4/2006 | Mason et al. |
| 2006/0105751 | A1 | 5/2006 | Bloom |
| 2006/0155591 | A1 | 7/2006 | Altaf et al. |
| 2006/0184417 | A1 | 8/2006 | Van der Linden et al. |
| 2006/0230137 | A1 | 10/2006 | Gare et al. |
| 2006/0270419 | A1 * | 11/2006 | Crowley et al. ............. 455/456.2 |
| 2006/0278702 | A1 | 12/2006 | Sakai |
| 2007/0001835 | A1 | 1/2007 | Ward et al. |
| 2007/0001841 | A1 | 1/2007 | Anders et al. |
| 2007/0069884 | A1 | 3/2007 | Waxman |
| 2007/0096871 | A1 | 5/2007 | Mason et al. |
| 2007/0100704 | A1 | 5/2007 | Liu et al. |
| 2007/0162315 | A1 | 7/2007 | Hodges |
| 2007/0273474 | A1 | 11/2007 | Levine |
| 2007/0286378 | A1 * | 12/2007 | Brown et al. ............. 379/201.01 |
| 2008/0014947 | A1 | 1/2008 | Carnall |
| 2008/0059254 | A1 | 3/2008 | Vivadelli et al. |
| 2008/0068162 | A1 | 3/2008 | Sharma et al. |
| 2008/0129444 | A1 | 6/2008 | Nasimi |
| 2008/0153511 | A1 * | 6/2008 | Mock .......................... 455/456.3 |
| 2008/0162198 | A1 | 7/2008 | Jabbour et al. |
| 2008/0182590 | A1 | 7/2008 | Ruckart et al. |
| 2008/0195457 | A1 | 8/2008 | Sherman et al. |
| 2008/0270238 | A1 | 10/2008 | Zweben et al. |
| 2008/0291013 | A1 | 11/2008 | McCown et al. |
| 2009/0005069 | A1 | 1/2009 | McAlexander |
| 2009/0018996 | A1 | 1/2009 | Hunt et al. |
| 2009/0022131 | A1 | 1/2009 | Rusanen et al. |
| 2009/0058638 | A1 | 3/2009 | Kanaglia et al. |
| 2009/0106077 | A1 | 4/2009 | Bhogal et al. |
| 2009/0119400 | A1 * | 5/2009 | Fukazawa ..................... 709/224 |
| 2009/0148827 | A1 * | 6/2009 | Argott ........................... 434/433 |
| 2009/0163224 | A1 | 6/2009 | Dean et al. |
| 2009/0186611 | A1 | 7/2009 | Stiles et al. |
| 2009/0215469 | A1 * | 8/2009 | Fisher et al. ................ 455/456.3 |
| 2009/0219156 | A1 | 9/2009 | August et al. |
| 2009/0222324 | A1 | 9/2009 | Johnson |
| 2009/0237203 | A1 | 9/2009 | Determan et al. |
| 2009/0273441 | A1 | 11/2009 | Mukherjee |
| 2009/0298514 | A1 | 12/2009 | Ullah |
| 2009/0307096 | A1 | 12/2009 | Antonellis |
| 2010/0015993 | A1 | 1/2010 | Dingler et al. |
| 2010/0090827 | A1 | 4/2010 | Gehrke et al. |
| 2010/0097214 | A1 | 4/2010 | Sweeney et al. |
| 2010/0106748 | A1 * | 4/2010 | Schultz et al. ................ 707/803 |
| 2010/0109864 | A1 | 5/2010 | Haartsen et al. |
| 2010/0114613 | A1 * | 5/2010 | Smith et al. ....................... 705/5 |
| 2010/0146499 | A1 * | 6/2010 | Bush et al. ..................... 717/178 |
| 2010/0151821 | A1 | 6/2010 | Sweeney et al. |
| 2010/0161432 | A1 | 6/2010 | Kumanov et al. |
| 2010/0273509 | A1 | 10/2010 | Sweeney et al. |
| 2010/0277315 | A1 | 11/2010 | Cohn et al. |
| 2010/0283579 | A1 | 11/2010 | Kraus et al. |
| 2010/0318615 | A1 | 12/2010 | Griffin |
| 2010/0332268 | A1 | 12/2010 | Ohmori et al. |
| 2011/0010218 | A1 | 1/2011 | Gupta |
| 2011/0128145 | A1 | 6/2011 | Todd et al. |
| 2011/0173263 | A1 * | 7/2011 | Beers et al. .................... 709/204 |

OTHER PUBLICATIONS

U.S. Appl. No. 12/428,051; Notice of Allowance dated Dec. 28, 2012; 27 pages.

U.S. Appl. No. 12/256,359; Final Rejection dated Dec. 11, 2012; 35 pages.

U.S. Appl. No. 12/499,412; Non-Final Rejection dated Aug. 2, 2012; 36 pages.

U.S. Appl. No. 12/428,051; Non-Final Rejection dated Aug. 2, 2012; 36 pages.

U.S. Appl. No. 12/256,359; Final Rejection dated Sep. 13, 2011; 13 pages.

U.S. Appl. No. 12/256,359; Non-Final Rejection dated Mar. 18, 2011; 12 pages.

U.S. Appl. No. 12/256,359; Non-Final Rejection dated May 24, 2012; 35 pages.

U.S. Appl. No. 12/332,537; Final Rejection dated Nov. 9, 2011; 20 pages.

U.S. Appl. No. 12/332,537; Non-Final Rejection dated Apr. 27, 2011; 19 pages.

U.S. Appl. No. 12/428,051; Final Rejection dated Feb. 23, 2012; 19 pages.

U.S. Appl. No. 12/428,051; Non-Final Rejection dated Sep. 23, 2011; 21 pages.

U.S. Appl. No. 12/499,412; Requirement for Restriction/Election dated Apr. 27, 2012; 7 pages.

(56) References Cited

OTHER PUBLICATIONS

"Resource Scheduling in Hoteling Environments," published by www.peoplecube.com via web.archive.org on Jul. 21, 2008, pp. 1-3 of 3.

U.S. Appl. No. 12/428,051; Issue Notification dated Apr. 3, 2013; 1 page.

U.S. Appl. No. 12/499,412; Final Rejection dated Apr. 26, 2013; 22 pages.

U.S. Appl. No. 12/332,537; Non-Final Rejection dated Jan. 3, 2014; 39 pages.

U.S. Appl. No. 12/256,359; Interview Summary dated Jan. 14, 2014; 3 pages.

U.S. Appl. No. 12/499,412; Issue Notification dated Jan. 29, 2014; 1 page.

U.S. Appl. No. 12/256,359; Notice of Allowance dated Mar. 18, 2014; 20 pages.

U.S. Appl. No. 12/256,359; Non-Final Rejection dated Sep. 10, 2013; 42 pages.

U.S. Appl. No. 12/332,537; Final Rejection dated Sep. 12, 2013; 36 pages.

U.S. Appl. No. 12/499,412; Notice of Allowance dated Oct. 11, 2013; 41 pages.

U.S. Appl. No. 12/256,359; Issue Notification dated Jul. 9, 2014; 1 page.

U.S. Appl. No. 12/332,537; Final Rejection dated May 8, 2014; 33 pages.

U.S. Appl. No. 12/332,537; Notice of Allowance dated Nov. 7, 2014; 22 pages.

U.S. Appl. No. 12/332,537; Issue Notification dated Feb. 25, 2015; 1 page.

\* cited by examiner

GUEST MESSAGE SETUP  — □ X  320

- 322 — 24 HOUR PRIOR: Reminder Meeting @ 6PM
- 324 — WITHIN EVENT LOCATION ZONE: Parking lot A is full
- 326 — FRONT GATE: Please enter Code 5543
- 328 — INSIDE: Please go to Hall B
  :

FIG. 3C

USER PROFILE  — □ X  340

- 342 — NAME: Brian | Owens
- 344 — PREFERRED PHONE NUMBER: 214-555-1212
- 346 — ADDRESS: 2000 McKinney Avenue | CITY: Dallas | STATE: TX | ZIP: 75201
- 348 — FAMILY: SPOUSE: Kristy | KIDS: Jane, Bill, Emily
- 350 — PREFERENCES: Diet Coke; No Red Meat; Sports Channel

FIG. 6

SYSTEM AND METHOD FOR UTILIZING ATTENDEE LOCATION INFORMATION WITH AN EVENT PLANNER

BACKGROUND OF THE INVENTION

Meetings or events such as a convention, party, or wedding, will often involve a combination of many carefully timed activities. Some of the activities correspond to guests accepting an invitation, arriving at an event, leaving the event, among others. Historically, an invitation would be mailed to an invitee and the invitee would either call or mail a response. Any changes to the event details or further communication regarding the event would involve another letter or a phone call.

More recently, electronic calendar systems that are often tied to electronic mail (e-mail) have become an additional way for communicating invitations to events. Some electronic calendar systems allow an invitee to give notice of their intention to accept or decline an invitation by responding electronically, as well as to add event details to the invitees electronic calendar. Some electronic calendar systems also allow changes to the event information to be automatically communicated to invitees.

BRIEF SUMMARY OF THE INVENTION

In one or more embodiments of the present invention, a method for determining which guests are arriving or have arrived may be used to communicate updated or other information to the guests. Examples of information may include a security or gate code, which room or table the guest is assigned, which parking lot has available space, or any number of other useful items of information. In one or more embodiments of the present invention, by being able to readily and accurately know which guests are presently in attendance, an event coordinator may also gain useful information, which previously was determined by making an approximate guess. In one or more embodiments of the present invention, events, such as when to begin serving a meal, have people gather for a speech, or start a wedding procession, may now be timed more accurately than before.

In one embodiment, a system and method for providing enhanced event planning capabilities may include receiving information regarding an invitee. The invitee information may be stored for later use. Presence of the invitee at an event may be detected. The information may then be communicated to a communications device associated with the invitee regarding the event using the stored information, in response to the detected presence of the invitee.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
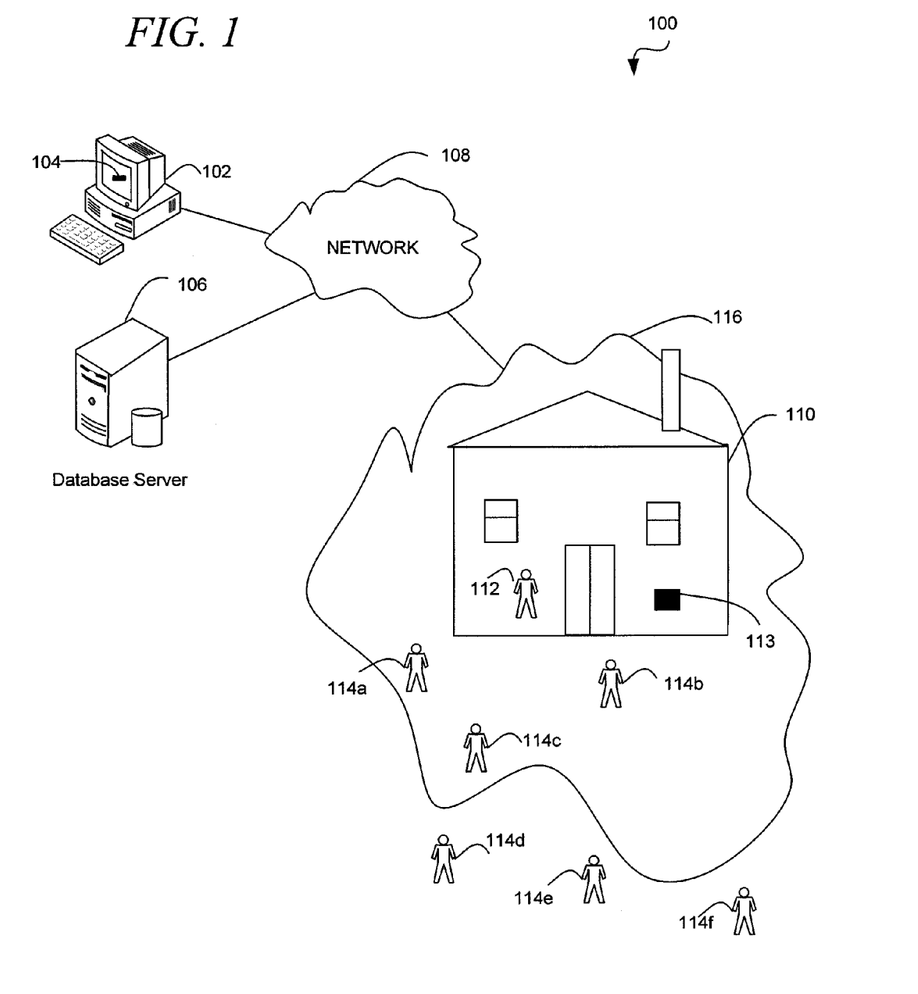
FIG. 1 is an illustration of one embodiment of an environment operable to provide advanced event planning capabilities, consistent with the present invention.

FIG. 1 is an illustration of one embodiment of an environment 100 operable to provide advanced event planning capabilities, consistent with the present invention. In one embodiment, an event management device 102 may include an event program 104, which may be in communication with a database server 106 via a communications network 108. The communications network 108 may additionally be in communication with an event location 110. At the event location 110, an event coordinator 112 may be responsible for keeping track of attendees 114a-114f (114). In one embodiment, using a presence detection device 113 in communication with the event management device 102, as well as the database server 106, the event coordinator 112 may be able to determine attendee information and provide attendees 114 with relevant communications. Some example attendee information may include whether attendees have arrived, personal preferences for the attendees, exact positions within an area once the attendees arrive, as well as many other useful pieces of information regarding the attendees or event.

In one embodiment, the event management device 102 may communicate relevant information about the event to attendees 114. An event location zone 116 may be defined around an event, which specifies a range in which the presence detection device 113 is able to detect attendees 114. In one embodiment, as attendees 114 enter into the event location zone 116, information may be communicated to the attendees 114, as well as to the event management device, via the presence detection device 113. The communicated information allows the event coordinator 112 to know which guests have arrived, as well as other useful information.

An event management device 102 may be a standalone computer, multiple computers, software running on one or more computers, or any other device capable of operating the event program 104. The event program 104 may be integrated within other software, such as a calendar or data planner, or may be a standalone program in communication with the communications network 108. In one embodiment, a database server 106 may additionally be included. In one embodiment, the database server 106 may contain information regarding attendees 114, which may be located in separate records, with each record representing a profile of an individual attendee. Alternatively, no database server 106 may be present, and attendee information may instead be stored within the event management device 102. In other embodiments, the database server 106 may contain a variety of information types, including attendee information, event information, service provider information, as well as any other type of information the event coordinator 112 may wish to store.

The communications network 108 may be the Internet, a LAN, a cellular network, a satellite network, a cable network, or any other network capable of communicating data between the event management device 102, attendees 114, and the event coordinator 112. The event location 110 may be any location where an event such as a party, wedding, convention, or any other meeting where attendee information may be useful to an event coordinator 112 for planning purposes, as well as for being able to send appropriate communications at appropriate times. The event coordinator 112 is primarily responsible for keeping track of attendee information and helping to ensure that the event runs smoothly. The event coordinator 112 may use a personal computing device, PDA, cell phone, smart phone, or any other device (not shown) that can display information received from the event management device 102 over the communications network 108.

The presence detection device 113 may be a femto cell, a pico cell, an antenna system, or a system using detection sensors, or any other system for presence detection. For example, in one embodiment, the presence detection device 102 is a femto cell including a wireless transceiver in communication with the event program 104 over the communications network 108. Another embodiment may include a presence detection device 102 that comprises detection sensors, based on facial recognition technology. The detections sensors may send information retrieved through the sensors over the communications network 108 to the event program 104. In one embodiment, multiple presence detection devices 113 may be included. The presence detection devices 113 may be of the same or different types. Having multiple devices or device types may be useful in the event that exterior presence, as well as presence within a building, are both desired to be known by the event coordinator 112. Additionally, multiple device types may be appropriate, depending upon the type or range of detection desired by the event coordinator 112.

The attendees 114 may have, or be provided with, a device for determining the attendees' location and receiving communications. In one embodiment, attendees 114 may be detected based upon signals from wireless communications devices (not shown), such as PDAs, cell phones or any other device capable of communicating a signal to the presence detection device 113. As can be seen in FIG. 1, attendees 114a, 114c and 114b are located within the event location zone 116. In one embodiment the event location zone 116 is determined based upon the furthest detection range of the presence detection device 113. Beyond the event location zone 116, the event coordinator 112 may have no knowledge of where particular attendees 114 are located. For example, in one embodiment, if 114d, 114e, and 114f have not yet reached the event location zone 116, attendees 114d-f will not be registered within the event management device 102.

Figure 2:
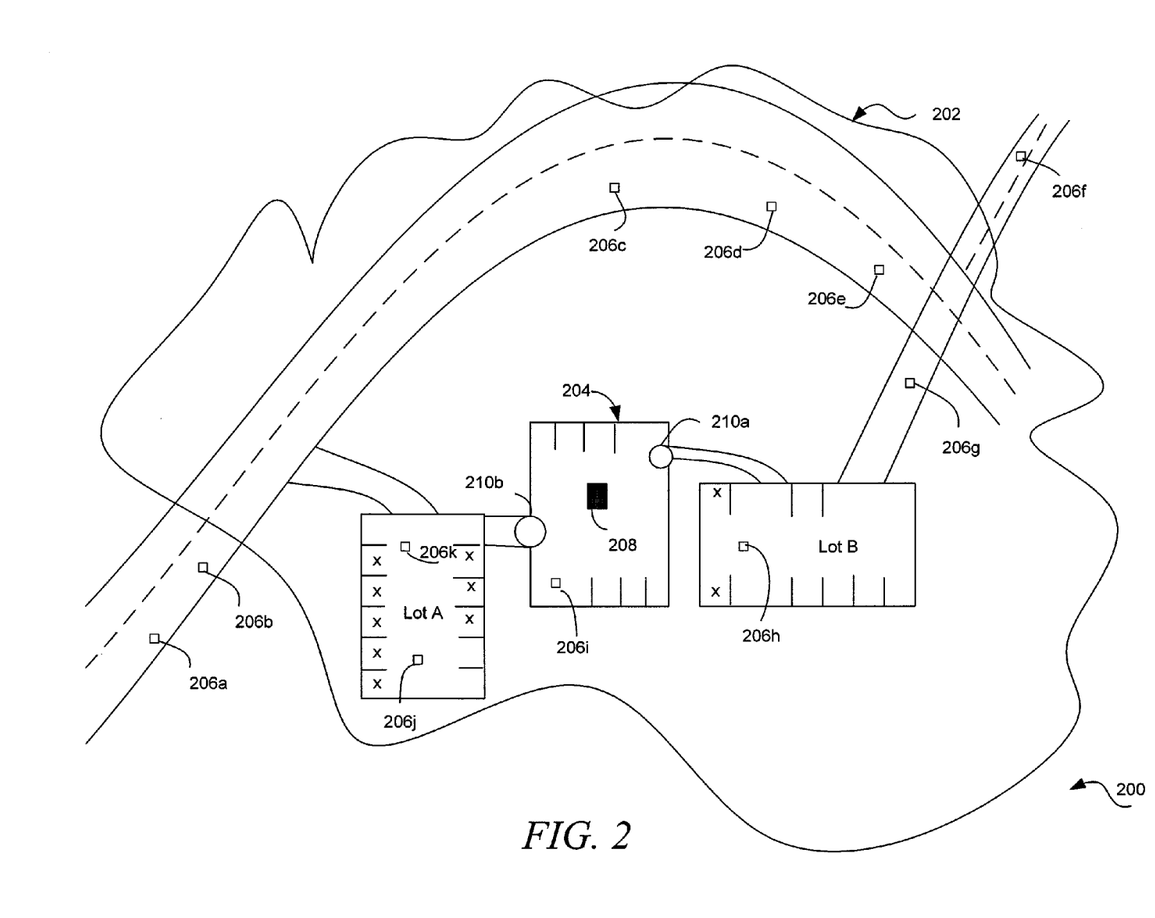
FIG. 2 is an illustration of one embodiment of an event location zone, consistent with the present invention.

FIG. 2 is an illustration 200 of one embodiment of an event location zone 202, consistent with the present invention. In this embodiment, an event location zone 202 is set up around an event location 204 to enable a presence detection device, and ultimately an event coordinator, to determine when attendees 206 arrive. As can be seen, attendees 206 approaching the event location zone 202 can be registered by the presence detection device 208. Various attendees 206 are depicted as being within the event location zone 202 and other attendees 206 are depicted outside of the event location zone 202. In this embodiment, attendee 206k, as well as attendee 206j, may have received notification that Lot A has available parking space, whereas attendee 206c, d, and e may be notified that Lot B has available space, and Lot A is full. The presence detection device 208, as it detects attendees 206, may communicate over a network to an event management device operating an event program, in order to determine useful information, such as available parking spaces as just described. When attendees 206a, b, and f enter within the event location zone 202, the presence detection device 208 will register their presence and may instruct the event management device to communicate a notification similar to "park in Lot B", therefore saving time and reducing congestion within the, already full, Lot A.

In one embodiment, as attendees arrive at the event location 204, at either event entry gate 210a or 210b, a message may be received by the attendee 206 instructing the attendee 206 of any entry codes that may be necessary to enter, as well as a room assignment, or any other information that the event coordinator feels would be beneficial to the attendee 206. In one embodiment, attendee 206i, having entered, may receive a communication that a particular room is available, and may guide the attendee 206i to the correct location.

Various categories of data may generated and communicated using the event management device. Some example event categories may include event data, location data, schedule data, registration data, emergency data, instruction data, and access data. Because of the wide range of uses for the event management system, some, or all, of these categories may be found in any given embodiment.

For event data, information such as a time and date for the event, topic for the event, or theme on an event may be included. Location data may include specific directions, from given points, detailed information regarding the area, among other similar information. Schedule data may include an itinerary of activities for an event, individual calendar information for attendees, or any other data related to the schedule of the event, event coordinator, or attendees. Registration data may include not only names of people that have responded that they will attend an event, but may also include information such as attendees that have already arrived, attendees that have paid any applicable entry fees, attendees that are no longer at the event, among many other types of information related to registration. In one embodiment, the event management device may also be useful in determining when particular people, such as a keynote speaker, have arrived, and may store this information as registration data. By allowing the event coordinator to have instant access to attendee information, such as registration data, there is less chance of starting an event prematurely, or any number of other problems which occurs by not knowing who is present within a location.

Emergency data may include attendee contact information, total number of people present in a location, a list of attendees still located within a particular location, emergency contact information, and any other type of information related to emergencies. In one embodiment, if an emergency occurs, a printout or other report may be received from the event management device indicating each person still remaining at an event location, and may provide useful details for emergency personnel attending at the scene. Instruction data, and similarly access data, may include gate codes, room assignments, parking availability, welcome messages, and other information in which an event coordinator may wish to provide as instructions or access information to attendees.

In one embodiment, by including a personal profile for each attendee 206, preferences may also be stored, allowing for personal needs and desires to be accounted for. For example, if it is known that a particular attendee does not like red meat, prefers a certain temperature in the room, or likes a particular subject, an event coordinator may either manually, or using the event management device, be able to accommodate the attendee 114 by providing personalized service or sending attendees with similar interests into the same area, or any number of other advantages.

Figure 3A:
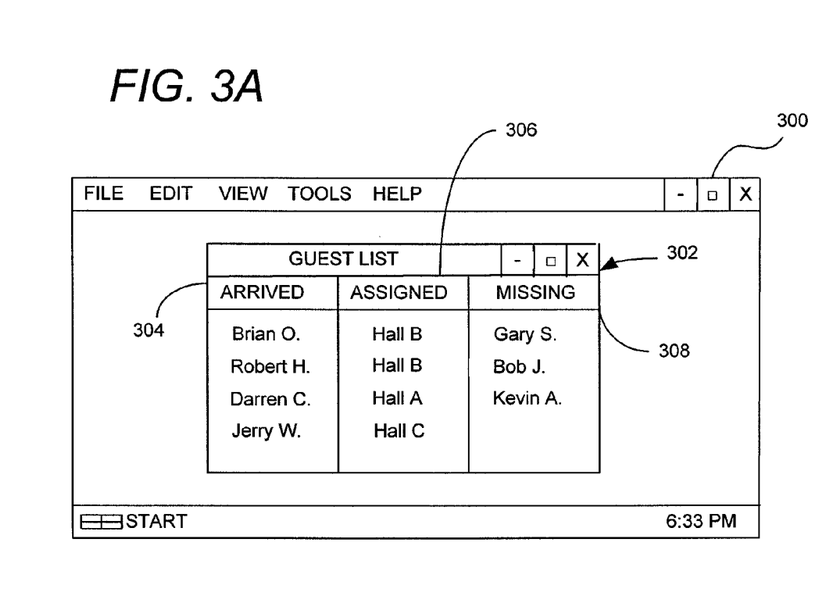
FIG. 3A is an illustrative example of one embodiment of a screen shot displaying guest information, consistent with the present invention.

FIG. 3A is an illustrative example of one embodiment of a screenshot 300 displaying a guest list window 302, consistent with the present invention. In this embodiment, the screenshot 300 displays the guest list window 302, which may be one window of the event program 104 from FIG. 1. The guest list window 302 displayed in FIG. 3A depicts an example guest list that may be generated by the event program 104 and used by an event coordinator. In the guest list window 302, in one embodiment, there may be three columns. Column 304 lists attendees that have arrived, column 306 lists an area in which the attendee is assigned, and column 308 lists attendees that have not yet arrived. As an attendee arrives at the event location, the attendee's profile may be accessed and an assignment may be made for the attendee. Additionally, communications may be sent to the attendee, as well as any other action the event coordinator has configured the event program to perform. At this point, the guest list window 302 may be updated to include the information that has been generated by the event management device, which allows the event coordinator to instantly be able to determine the presence of each attendee. In one embodiment, as the attendees leave the event location zone, the attendee's name may removed from the list, or otherwise be marked as having left. In another embodiment, additional columns may account for situations not previously described. For example, if additional attendees arrive who are unregistered or did not RSVP, there may be a separate list for these guests. By providing an separate column of unregistered guests, and event planner may be able to determine if additional food or drinks may be needed, additional table settings placed or any number of other reasons.

Figure 3B:
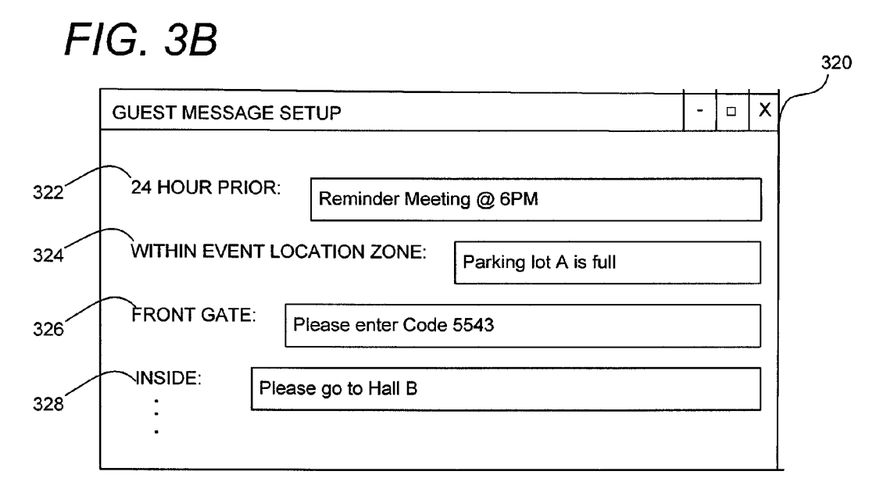
FIG. 3B is an illustrative example of one embodiment of a screen shot displaying a guest message setup screen, consistent with the present invention.

FIG. 3B is an illustrative example of one embodiment of a screenshot displaying a guest message setup screen 320, consistent with the present invention. The guest message setup screen 320 may include various fields, with each field representing a field in a database entry associated with the attendee. In this embodiment, four fields are displayed. A pre-event field 322 may allow an event coordinator to enter any messages which the event coordinator would like attendees to receive 24 hours in advance of a scheduled event time. In alternative embodiments, any number of hours or time period may be selected for when pre-event messages are desired to be communicated. A location zone field 324 may be also provided for sending communications to attendees that have entered within the event location zone. For example, "Parking Lot A is full," may be one message that may be sent to attendees within the event location zone as described in FIG. 2. Messages such as the location zone field 324 may be derived in real-time, based on calculations such as a parking lot being full, or may be determined beforehand, such as a static message saying "Welcome!" or some other message not dependent upon space availability or other real-time variables.

An event entry field 326 may also be included within one embodiment. Labeled "Front Gate," a message saying "Please Enter Code 5543" may be sent as the presence detection device determines the attendee is located at the front gate. An interior field 328, which in this embodiment is labeled "Inside," may contain a message to be communicated, such as "Please go to Hall B," upon a determination that the attendee is within the actual event site. Once again, the message may be static, derived from other calculations depending upon space availability, or may be pulled from the database record associated with the attendee. Any number of fields may exist or be created for various locations or conditions as the event coordinator determines is necessary.

Figure 3C:
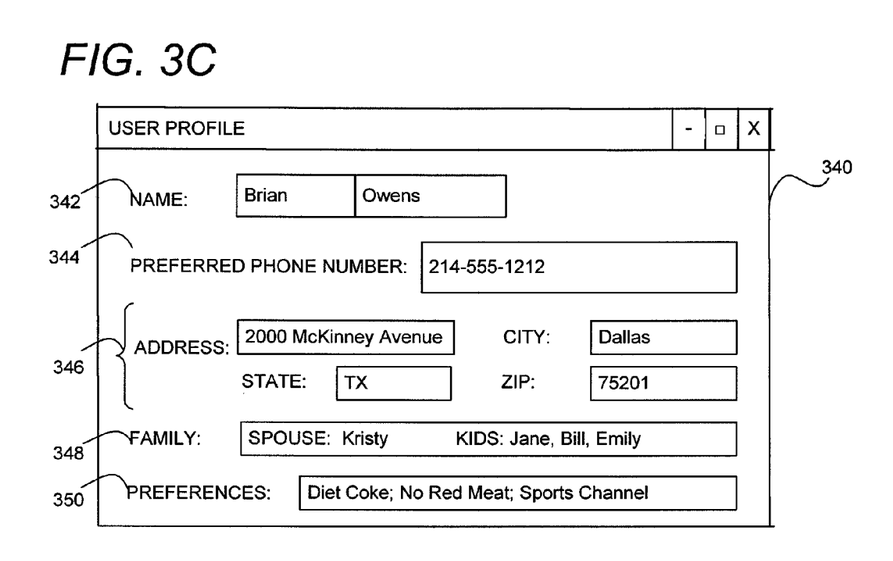
FIG. 3C is an illustrative example of one embodiment of a screen shot displaying a guest profile entry screen.

FIG. 3C is an illustrative example of one embodiment of a screenshot displaying a guest profile entry screen 340. The entry screen 340, labeled "User Profile," may include a number of fields containing information regarding an attendee. In one embodiment, a name field 342 may be provided to associate a record with the attendee's name. A preferred phone number field 344 may be provided, which allows an event coordinator to have access to preferred contact information for the attendee. In one embodiment, the preferred phone number field 344 is used by the event management device in order to determine when the attendee has arrived within the event location zone. Presence detection devices, including pico or femto cells, may detect that a communications device with the preferred phone number listed within an attendees profile has arrived within the event location zone and update a guest list, similar to the guest list, described previously. Additional fields may include an address field 346 listing a preferred contact address, a family member field 348 for listing family members of the attendee, and a preferences field 350 to allow preferences or other information to be stored in an attendee's profile.

Figure 4:
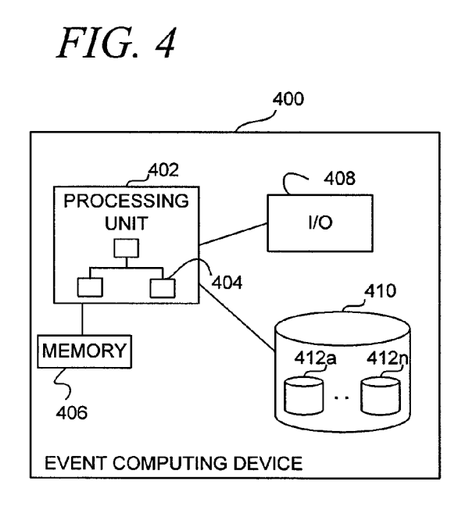
FIG. 4 is a block diagram depicting components of one embodiment of an event management device operable to provide event planning services, consistent with the present invention.

FIG. 4 is a block diagram depicting components of one embodiment of an event management device 400 operable to provide event planning services, consistent with the present invention. The event management device 400 may include a processing unit 402 for processing and accessing event data, accessing stored profile data, as well as any other data used for the event management device. The processing unit 402 may execute software 404 operable to perform functionality of the event management device 400, including attendee locating, message communication, and other event planner functionalities. Software modules that operate in the software 404 are described below in more detail in reference to FIG. 5.

Memory 406 may also be located within the event management device 400 for storing data being processed by the processor 402. The event management device 400 may include an input/output (I/O) unit 408 for receiving and communicating location data and guest communications, as well as other inputs or outputs relating to the event management device 400.

A data storage unit 410 may be included in, or be in communication with, the event management device 400. The data storage unit 410 may be a hard drive or any other type of volatile or non-volatile memory capable of storing data. Within the data storage unit 410 may be one or more data repositories 412a-412n (412), such as a database or multiple databases, capable of storing and organizing data. Some example data may include attendee or guest profiles, event information, pre-determined messages, and any other data that may need to be stored relating to the event management device 400. In one embodiment, rather than including the data storage unit 410, the event management device 400 may use a memory 406 that is large enough to store any necessary data.

Figure 5:
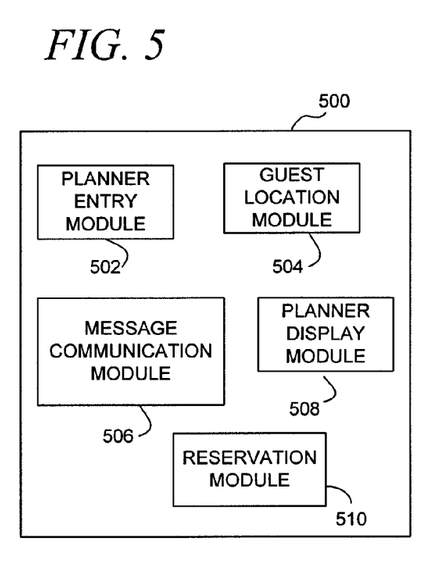
FIG. 5 is a block diagram of one embodiment of modules configured to provide advanced event planning capabilities, consistent with the present invention.

FIG. 5 is a block diagram of one embodiment of modules 500 configured to provide advanced event planning capabilities, consistent with the present invention. In one embodiment, a planner entry module 502 may be provided and stored within, or in communication with, an event management device 102. The planner entry module 502 may allow an invitee, an event planner, or any other person with access to the event management device to enter data within the event management device 102. Sample information that may be included within an event management device 102 may include an attendee profile, such as a record including a name, preferred phone number, address, family members, preferences, or any other information related to an attendee. The planner entry module 502 may additionally include the ability for an event planner or other person with access to the event management device 102, to enter guest messages, which are to be delivered at select points in time or location. FIG. 3D, described previously, depicts an example of various guest messages which may be entered by the event planner or otherwise, into the event management device 102. In one embodiment, the planner entry module 502, additionally receives data and other information from a presence detection device 113, which may allow the event management device 102 to send appropriate communications at an appropriate time.

A guest location module 504 may additionally be included within the event management device 102. The guest location module 504 may interface with various detection device, such as detection sensors, a pico cell, a femto cell, or any other detection device in use by the event planner. In one embodiment, when an invitee or guest is located within an event location area, the guest location module 504 may detect that the guest has arrived, and communicate that information to the event management device 102. In one embodiment, the guest location module 504 may be located within the presence detection device 113 in order to more closely interact with the detection devices at an event. If the guest location module 504 is located outside of the presence detection device 113, such as within the event management device 102, the network between the event management device 102 and the presence detection device 113 may be used to communicate guest location information between the two devices.

A message communication module 506 may be included for communicating messages between the event management device 113, the invitees 114, and the event coordinator 112. The message communication module 506 may be configured to communicate over satellite, the Internet, a LAN, WAN, or any other communications network operable to communicate messages between the event management device 102, the invitee 114, and the event coordinator 112. Either before an event, during an event, or following an event, messages may be desired to be communicated from an event planner to invitees for various reasons. In one embodiment, by including a message communication module 506, the event management device 102 has the capability to communicate communications with invitees, allowing for the advance functionality of the present invention.

A planner display module 508 may be provided for allowing the event management device 102 to display various menus or other screens, which an event planner may find useful in planning an event. The planner display module 508 may generate screens, such as those described in FIGS. 3A-3C, along with others not specifically described herein. An event coordinator may interact with the planner display module to receive information, as well as input information into setup screens.

A reservation module 510 may be included for allowing an invitee to check-in to an event. Upon being detected by the presence detection device, an invitee may be given the option to check into the event. Alternatively, the reservation module 510 may be triggered automatically upon determination to begin check-in for the invitee. In one embodiment, rather than checking into an event, a hotel or restaurant may apply a similar event planner to their business, and allow a guest to be detected, reservation detected by using the reservation module 510, and be given the option to automatically check-in to a hotel room or for seating at a restaurant. There are a broad range of other applications where an event planner, as described herein, can be modified for uses outside of what would ordinarily be considered an event, with a hotel and restaurant situation being just two examples.

Figure 6:
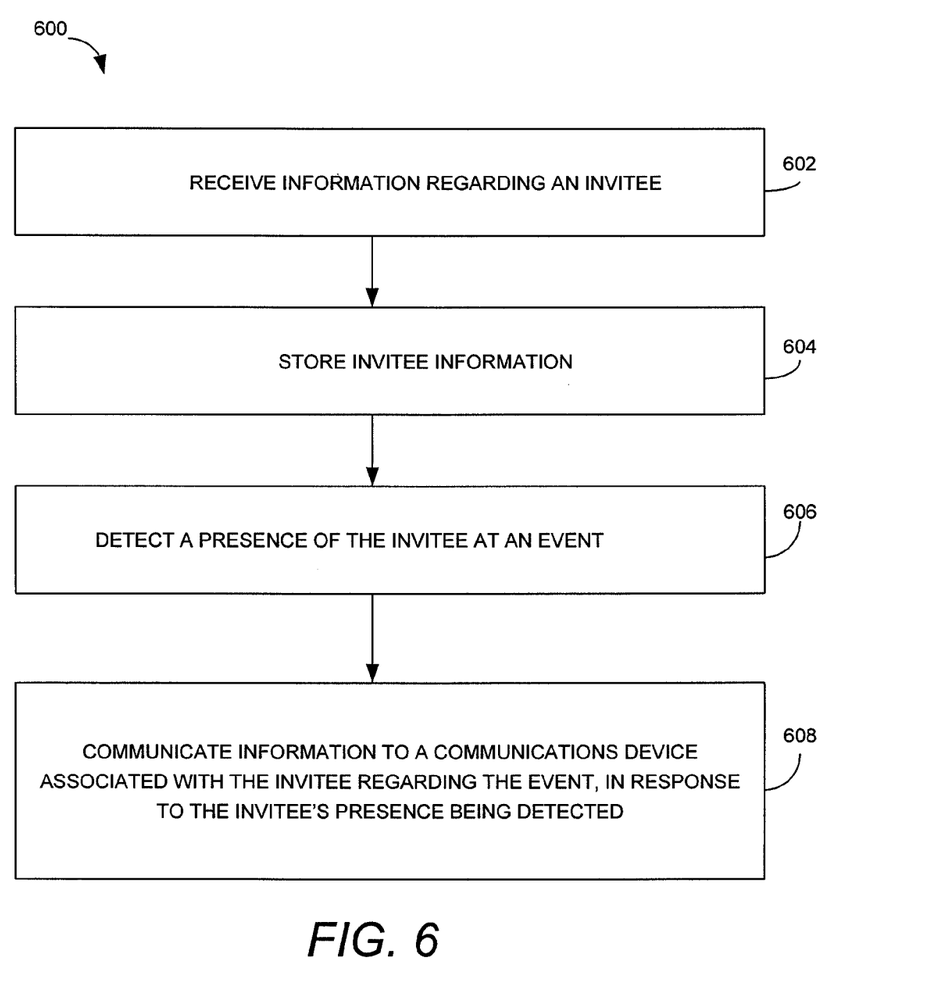
FIG. 6 is a flowchart of one embodiment of a method for providing advanced event planning capabilities.

FIG. 6 is a flowchart of one embodiment of a method 600 for providing advanced event planning capabilities. In step 602, information regarding an invitee may be received. The received information may include an invitee's or attendee's name, address, telephone number, email address and other contact information, as well as preferences, preferred settings, or any other information that an event coordinator may find useful. In one embodiment, information may be received from an invitee using a web interface, telephone interface, or an operated assisted interface, but may also received from pre-existing databases or other data sources. In one embodiment, the received information may be input by an invitee, by an event coordinator, or any other person with permission to input information. Information may be received in advance of an event that is to occur in the future, while an event is ongoing or at various other times.

In step 604, invitee information may be stored for use by the event planner. In one embodiment, a separate database storage server, or a storage area within the event management device, may be used for storing invitee information. By having stored invitee information, as invitations are generated, a user arrives at an event, or an invitee is attending an event, relevant information about the invitee may be accessed and used in order to provide advanced event planning capabilities. In addition to storing invitee information, other embodiments may store one or more of event information, location data, schedule data, registration data, emergency data, instruction data, and access data, as described previously in reference to FIG. 2.

In step 606, the presence of an invitee may be detected at an event. Using the various tools described previously, such as detection sensors, femto cell, pico cell, or any other means, as invitees arrive at an event, the event planning program may detect an invitee's presence and access the invitee record at that time. In one embodiment, an event coordinator may wish to receive a list of all invitees that are presently in attendance, and based upon the information generated by detecting the presence of the invitees at the event, the event coordinator will be able to have this information readily available at his or her fingertips.

In step 608, information regarding the event may be communicated to a communications device that is associated with the invitee, in response to the invitee's presence being detected. In one embodiment, an invitee may arrive at the event, be detected by the event planning system, and then receive a communication from the event planning system indicating a pass code to use for a gate, last minute details regarding the event, or any other communications in which the event planner wishes to communicate to an invitee. Communication may alternatively be sent in response to a set time or any number of other factors, in addition to or in place of, presence detection.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for providing advanced event planning capabilities, said method comprising:
   receiving information regarding an invitee, said information being input by the invitee using a web interface prior to an event;
   storing invitee information;

detecting a presence of the invitee prior to the invitee checking in at the event, wherein the presence of the invitee is detected while the invitee is in an event location zone surrounding an event location;

detecting a position of the invitee within the event location zone;

communicating information to a communications device associated with the invitee regarding the event, in response to the detected presence and position, which communicated information is communicated to the invitee while the invitee is in the event location zone surrounding the event location and communicated before the invitee checks in at the event;

locating a reservation for the detected invitee;

allowing the detected invitee to check in at the event, in response to locating a reservation for the invitee;

managing a list of attendees for the event;

in response to detecting the presence of the invitee, identifying the invitee as having arrived and including the invitee in a first field of the list of attendees who have arrived;

in response to permitting an uninvited guest to check in to the event without a reservation, including the uninvited guest in a second field of the list of attendees who have arrived; and performing an event coordinator action in response to the listing of one or more uninvited guests on the list of attendees.

2. The method according to claim 1, wherein detecting a presence of the invitees at an event includes detecting whether the invitee is within a predetermined distance of an event location.

3. The method according to claim 1, wherein communicating information to a communications device includes communicating a map to the invitee.

4. The method according to claim 1, wherein receiving information regarding an invitee includes receiving contact information regarding an invitee.

5. The method according to claim 1, wherein receiving information regarding an invitee includes receiving personal preference information regarding an invitee.

6. The method according to claim 1, wherein communicating information to a communications device includes communicating an access code for entry to an event.

7. The method according to claim 1, further including determining information to communicate to an invitee, in response to detecting a presence of the invitee at an event.

8. The method according to claim 1, wherein detecting a presence of the invitee includes detecting the presence using GPS coordinates from a communications device.

9. An event management device, the event management device comprising:
a memory component operable to store computer executable instructions;
an input/output unit operable to communicate data associated with invitees;
a processing unit operable to execute the computer executable instructions, said processing unit configured to:
receive information regarding an invitee said information being input by the invitee using a web interface prior to an event;
store invitee information;
detect a presence of the invitee prior to the invitee checking in at the event, wherein the presence of the invitee is detected while the invitee is in an event location zone surrounding an event location;
detect a position of the invitee within the event location zone;
communicate information to a communications device associated with the invitee regarding the event, in response to the detected presence and position, which communicated information is communicated to the invitee while the invitee is in the event location zone surrounding the event location and communicated before the invitee checks in at the event;
locate a reservation for the detected invitee;
allow the detected invitee to check in at the event, in response to locating a reservation for the invitee
manage a list of attendees for the event;
in response to detecting the presence of the invitee, identify the invitee as having arrived and include the invitee in a first field of the list of attendees who have arrived;
in response to permitting an uninvited guest to check in to the event without a reservation, include the uninvited guest in a second field of the list of attendees who have arrived; and
perform an event coordinator action in response to the listing of one or more uninvited guests on the list of attendees.

10. The event management device according to claim 9, wherein the processing unit, in detecting a presence of the invitees at an event, detects whether the invitee is within a predetermined distance of an event location.

11. The event management device according to claim 9, wherein said processing unit, in communicating information to a communications device, communicates a map to the invitee.

12. The event management device according to claim 9, wherein in receiving information regarding an invitee, the processing unit is configured to receive contact information regarding an invitee.

13. The event management device according to claim 9, wherein, in receiving information regarding an invitee, the processing unit is configured to receive personal preference information regarding an invitee.

14. The event management device according to claim 9, wherein, in communicating information to a communications device, the processing unit is configured to communicate an access code for entry to an event.

15. The event management device according to claim 9, wherein the processing unit is further configured to determine information to communicate to an invitee, in response to detecting a presence of the invitee at an event.

16. An femto cell, the femto cell comprising:
a memory component operable to store computer executable instructions;
a transceiver operable to communicate data;
a processing unit operable to execute the computer executable instructions, said processing unit configured to:
receive information regarding an invitee said information being input by the invitee using a web interface prior to an event;
store invitee information;
detect a presence of the invitee prior to the invitee checking in at an event, wherein the presence of the invitee is detected while the invitee is in an event location zone surrounding an event location;
detect a position of the invitee within the event location zone;
communicate information to a communications device associated with the invitee regarding the event, in response to the detected presence and position which communicated information is communicated to the invitee while the invitee is in the event location zone surrounding the event location and communicated before the invitee checks in at the event;

locate a reservation for the detected invitee; and allow the detected invitee to check in at the event, in response to locating a reservation for the invitee manage a list of attendees for the event;

in response to detecting the presence of the invitee, identify the invitee as having arrived and include the invitee in a first field of the list of attendees who have arrived;

in response to permitting an uninvited guest to check in to the event without a reservation, include the uninvited guest in a second field of the list of attendees who have arrived; and perform an event coordinator action in response to the listing of one or more uninvited guests on the list of attendees.

* * * * *